United States Patent
Hinsley

(10) Patent No.: US 7,588,410 B2
(45) Date of Patent: Sep. 15, 2009

(54) PNEUMATIC CONVEYOR AND CONVEYOR SECTION HAVING A CURVED CONVEYOR PATH

(75) Inventor: Dan Davis Hinsley, Maysville, GA (US)

(73) Assignee: Fowler Products Company, LLC, Athens, GA (US)

( * ) Notice: Subject to any disclaimer, the term of this patent is extended or adjusted under 35 U.S.C. 154(b) by 163 days.

(21) Appl. No.: 11/877,958

(22) Filed: Oct. 24, 2007

(65) Prior Publication Data

US 2009/0110494 A1    Apr. 30, 2009

(51) Int. Cl.
  *B65G 21/00* (2006.01)
  *B65G 53/04* (2006.01)
(52) U.S. Cl. .................. 414/676; 198/861.1; 406/86; 406/88
(58) Field of Classification Search .............. 198/861.1, 198/860.2; 414/676; 406/86, 88
See application file for complete search history.

(56) References Cited

U.S. PATENT DOCUMENTS

| | | | |
|---|---|---|---|
| 3,395,943 A * | 8/1968 | Wilde et al. .................. 406/88 |
| 3,605,994 A * | 9/1971 | Parlette ................... 198/861.1 |
| 4,744,702 A | 5/1988 | Wiseman et al. | |
| 4,828,434 A | 5/1989 | Fairman et al. | |
| 5,037,245 A * | 8/1991 | Smith .......................... 406/88 |
| 5,122,016 A | 6/1992 | Lenhart | |
| 5,129,765 A * | 7/1992 | Smith et al. .................... 406/86 |
| 5,209,387 A * | 5/1993 | Long et al. ................. 226/97.3 |
| 5,222,840 A * | 6/1993 | Ingraham et al. .............. 406/88 |
| 5,394,972 A | 3/1995 | Aidlin et al. | |
| 5,466,096 A | 11/1995 | Hilbish et al. | |
| 5,503,505 A | 4/1996 | Vejchoda | |
| 5,682,977 A * | 11/1997 | White ..................... 198/860.5 |
| 6,190,094 B1 | 2/2001 | Rediess et al. | |
| 6,227,357 B1 * | 5/2001 | Brown, Sr. ............... 198/861.4 |
| 6,293,736 B1 | 9/2001 | Farquhar | |
| 6,378,695 B1 * | 4/2002 | Rinne ...................... 198/836.3 |
| 6,843,367 B1 | 1/2005 | Gentile et al. | |
| 7,140,827 B2 * | 11/2006 | Ikehata et al. ............... 414/676 |
| 7,284,945 B2 * | 10/2007 | Ikehata et al. ............... 414/676 |
| 7,329,299 B2 * | 2/2008 | Moriya et al. .............. 55/385.6 |

* cited by examiner

*Primary Examiner*—Douglas A Hess
(74) *Attorney, Agent, or Firm*—Thompson Hine LLP

(57) ABSTRACT

In a pneumatic conveyor comprising multiple, assembled conveyor sections, a conveyor section provides a curved conveyor path with a plenum through which pressurized air is delivered. The conveyor section includes a top plate including a series of apertures extending therethrough for delivering pressurized air from the plenum to an upper surface of the top plate. The apertures are arranged and configured to direct the pressurized air to move an article along the top plate in a conveying direction. A bottom plate is located beneath the top plate. A first stack of vertically aligned, individual strips are clamped together between the top plate and the bottom plate to define a first sidewall of the plenum. A second stack of vertically aligned, individual strips are clamped together between the top plate and the bottom plate to define a second sidewall of the plenum.

17 Claims, 7 Drawing Sheets

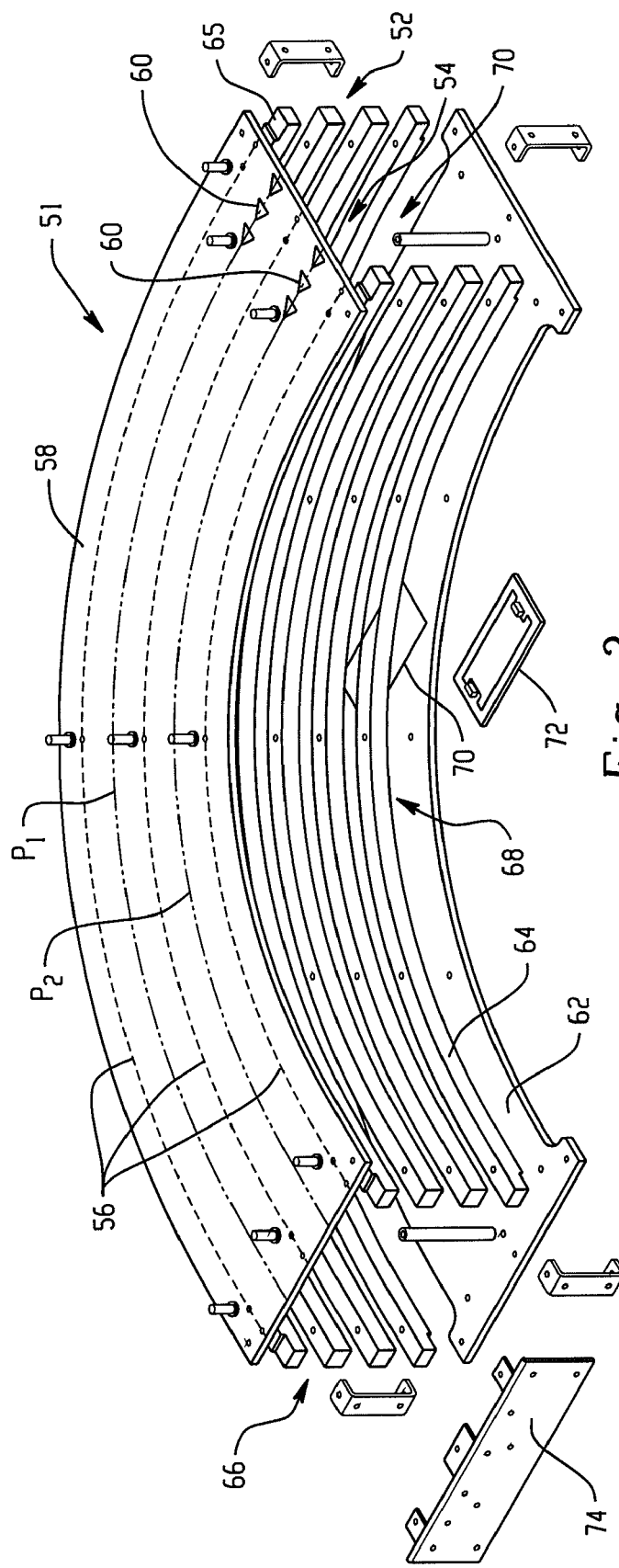
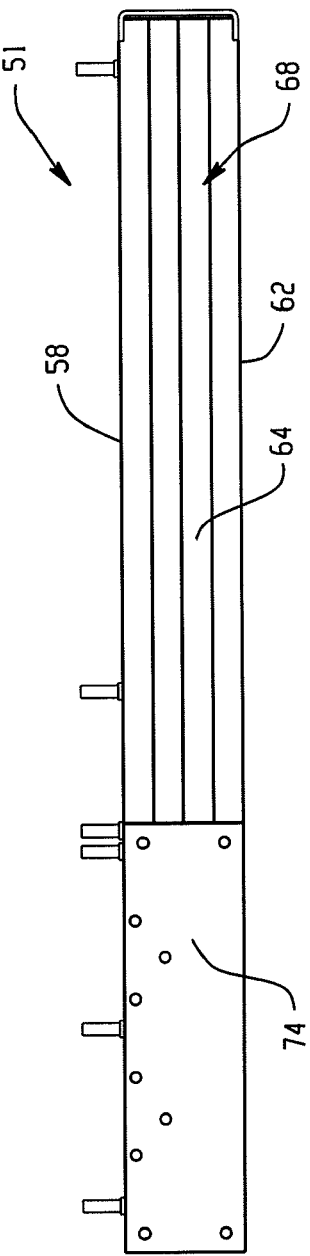
Fig. 3
Fig. 4

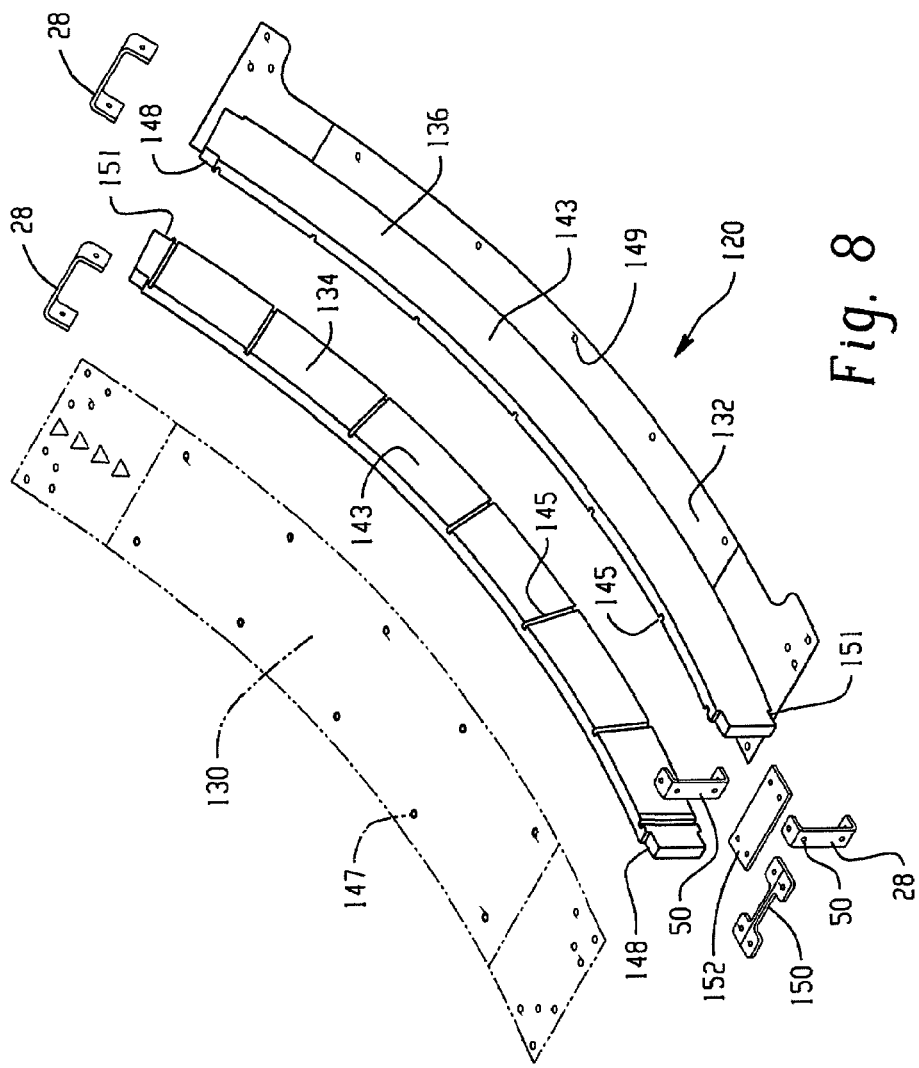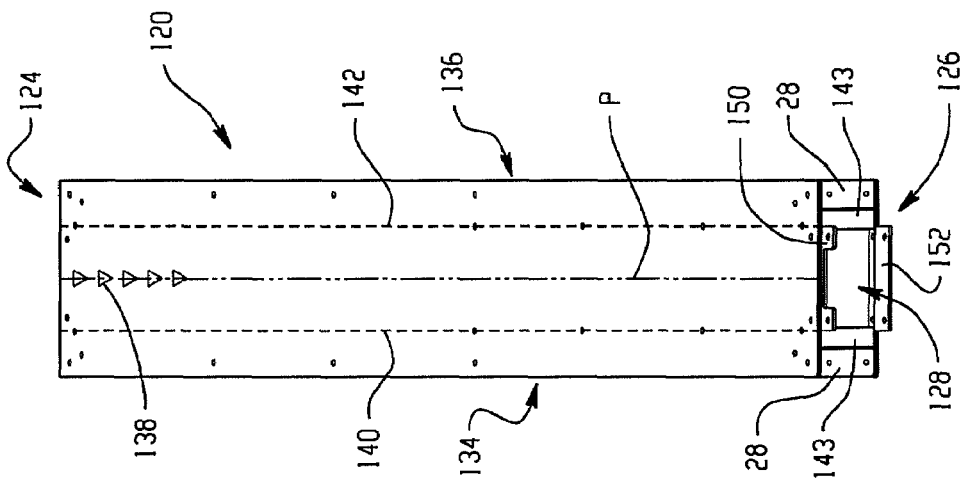

PNEUMATIC CONVEYOR AND CONVEYOR SECTION HAVING A CURVED CONVEYOR PATH

TECHNICAL FIELD

The present application relates to pneumatic conveyors and more particularly to a pneumatic conveyor with a conveyor section having a curved conveyor path.

BACKGROUND

Air or pneumatic conveyors are frequently employed to move objects, such as container caps, along a conveyor path. The conveyor path may be formed by numerous conveyor sections that are connected to each other to form a plenum structure which extends along the conveyor path. The conveyor sections may include an upper wall along which the objects move that includes a series of louvers or apertures thereby providing communication with the plenum so that air can escape therethrough to move the objects.

In many instances, the conveyor sections include turns (e.g., horizontally and/or vertically-oriented turns). The turn conveyor sections may be formed using a welding process during which metal side plates are carefully welded to upper and lower plates thereby forming the plenum. The welded areas are then ground to achieve a smooth finish and acceptable appearance. Such welding processes can take time and require welding skill to minimize any deformation of the material forming the conveyor sections.

SUMMARY

In an aspect, in a pneumatic conveyor comprising multiple, assembled conveyor sections, a conveyor section provides a curved conveyor path with a plenum through which pressurized air is delivered. The conveyor section includes a top plate including a series of apertures extending therethrough for delivering pressurized air from the plenum to an upper surface of the top plate. The apertures are arranged and configured to direct the pressurized air to move an article along the top plate in a conveying direction. A bottom plate is located beneath the top plate. A first stack of vertically aligned, individual strips are clamped together between the top plate and the bottom plate to define a first sidewall of the plenum. A second stack of vertically aligned, individual strips are clamped together between the top plate and the bottom plate to define a second sidewall of the plenum.

In another aspect, a method of assembling a pneumatic conveyor including multiple, assembled conveyor sections is provided. The method includes forming a conveyor section providing a curved conveyor path without any welding by stacking multiple plastic strips one on top of the other to form a first stack of plastic strips and stacking multiple plastic strips one on top of the other to form a second stack of plastic strips. The first and second stacks of plastic strips are clamped between an upper plate and a lower plate using only mechanical fasteners such that the first and second stacks form spaced-apart sidewalls of a plenum extending along the conveyor path for delivering pressurized air to apertures extending through the upper plate. The apertures are arranged and configured for directing the pressurized air for moving an article along the top plate in a conveying direction. The conveyor section is connected to an adjacent conveyor section.

In another aspect, in a pneumatic conveyor comprising multiple, assembled conveyor sections, a conveyor section is provided with a plenum through which pressurized air is delivered. The conveyor section includes a first side plate including a series of apertures extending therethrough for delivering pressurized air from the plenum to an outer surface of the side plate. The apertures are arranged and configured to direct the pressurized air to move an article along the side plate in a conveying direction. A second side plate is opposite the first side plate and spaced-apart therefrom. A first stack of aligned, individual strips are clamped together between the first and second side plates to define a top wall of the plenum. A second stack of aligned, individual strips are clamped together between the first and second side plates to define a bottom wall of the plenum.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 3 is an exploded view of another embodiment of a conveyor section for a pneumatic conveyor system;

FIG. 4 is a side view of the conveyor section of FIG. 3;

FIG. 7 is a front view of an embodiment of a conveyor section for a pneumatic conveyor system;

FIG. 8 is an exploded view of the conveyor section of FIG. 7;

DETAILED DESCRIPTION

Figure 1:
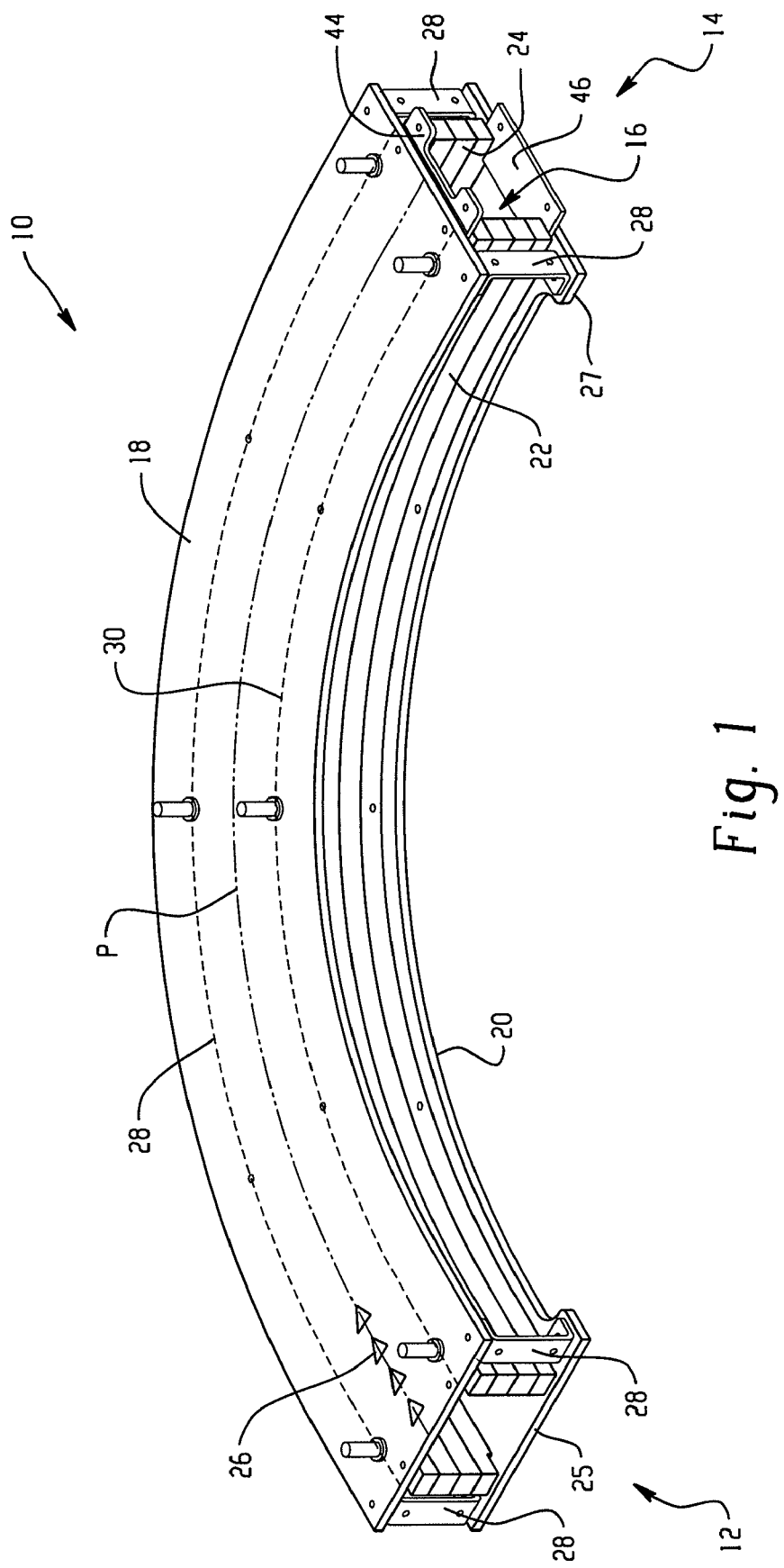
FIG. 1 is a perspective view of an embodiment of a conveyor section for a pneumatic conveyor system.

Referring to FIG. 1, a conveyor section 10 is for use in a pneumatic conveyor system to convey objects, such as caps for use in closing/sealing containers. The conveyor section 10 is a horizontal turn section for providing a bend in the conveyor path thereby changing the direction of travel of an object traveling therealong. The conveyor section 10 includes an infeed end 12, an outfeed end 14 and the conveyor path P that extends from the infeed to the outfeed side. A plenum 16 is provided, which is formed between an upper plate 18, a lower plate 20 and sidewalls 22 and 24 extending between the upper and lower plates. The plenum 16 provides a passageway for directing pressurized fluid such as air to louvers or apertures 26 formed through the upper plate 18. While apertures 26 are shown terminating near the infeed end 12, the apertures 26 actually continue along the conveyor path P to the outfeed end 14 (as an example, see FIG. 5). The apertures 26 are shaped and arranged to direct the pressurized air flowing therethrough in such a fashion as to move the object along the conveyor path P. In the illustrated embodiment, the apertures 26 are triangle-shaped, however, other shapes are possible. Guide rails 28 and 30 (represented by dotted lines) are provided for use in guiding the objects along the conveyor path P.

As can be seen, the upper plate 18 and the lower plate 20 are similarly shaped, both forming a U-shape that somewhat follows the conveyor path P. Lower plate 20 is narrower, however, along a mid-portion of its length and includes T-shaped ends 25 and 27 for use in connecting to the upper plate 18 using brackets 28.

Figure 2:
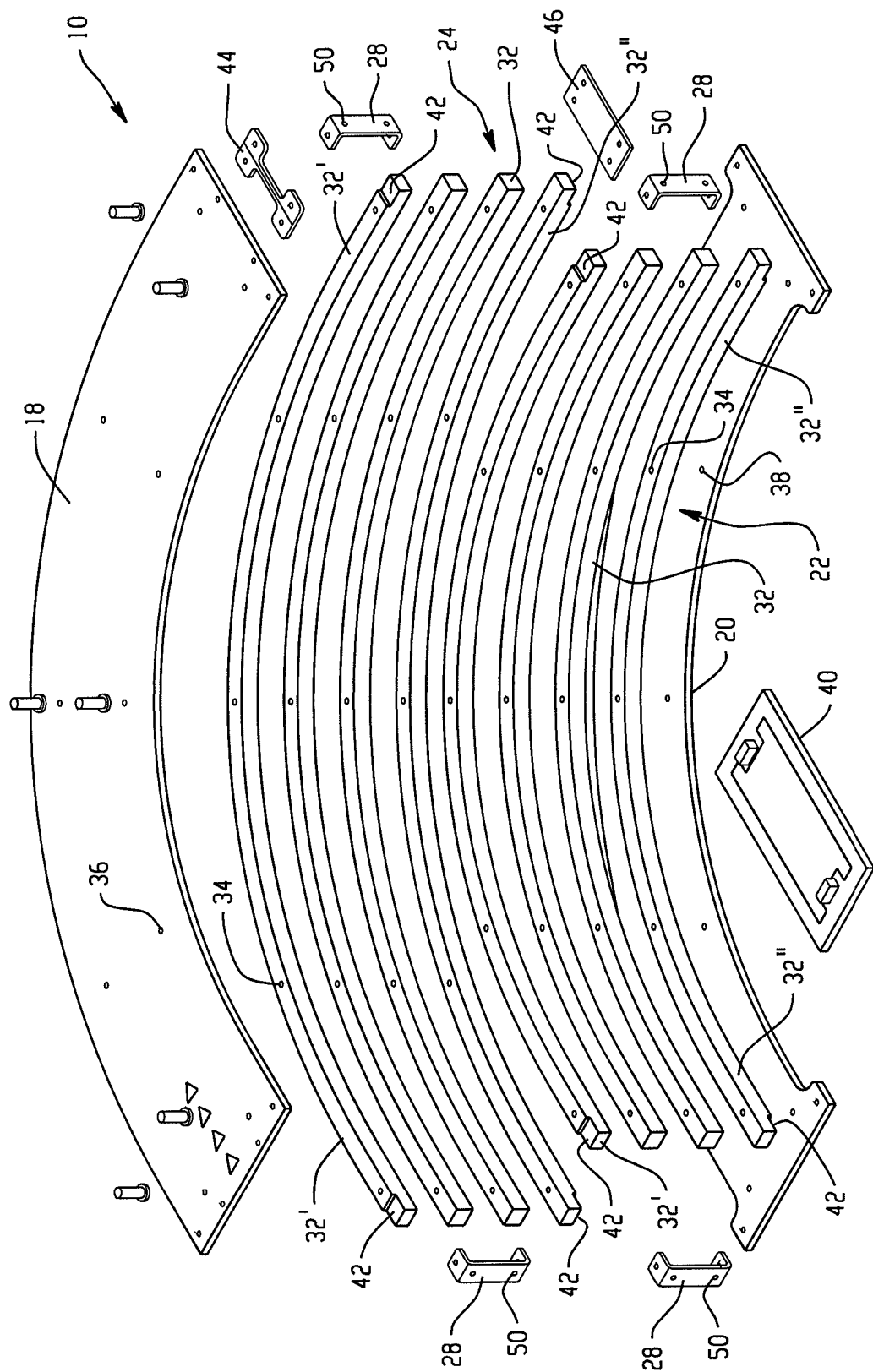
FIG. 2 is an exploded view of the conveyor section of FIG. 1.

An exploded view of the conveyor section 10 is shown by FIG. 2. The sidewalls 22 and 24 are formed by respective stacks of strips 32 that are aligned vertically and stacked one on top of another. In the illustrated example, each sidewall 22 and 24 includes four strips 32, however, any suitable number of strips may be used. Each strip 32 is also U-shaped, somewhat following the conveyor path P. The strips 32 include openings 34 that can be aligned with openings 34 of adjacent strips and with openings 36 formed in the upper plate 18 and openings 38 formed in the lower plate 20. Fasteners may be inserted through the aligned openings 34, 36 and 38 to fasten the assembly together. The lower plate 20 may include a clean-out opening for clearing debris from the plenum 16. The clean-out opening may be closed by a door 40 having closed and open configurations. In the illustrated embodiment, the door 40 is completely removable from the lower plate 20. Alternatively, the door 40 may be hinged to the lower plate 20, or any other suitable connection may be used.

Referring still to FIG. 2, the uppermost strip 32' and the lowermost strip 32" of each sidewall 22 and 24 each include a notch 42 at their respective ends. The notches 42 of the uppermost strips 32' face upwardly toward the upper plate 18 and the notches 42 of the lowermost strips 32" face downwardly toward the lower plate 20. Once assembled, the notches 42 provide a gap between the upper plate 18 and the uppermost strips 32' and the lower plate 20 and the lowermost strips 32". Splicer plates 44 and 46 are sized to be located in the gaps formed by the notches (see FIG. 1). The splicer plates 44 and 46 are also sized to fit within similar gaps of an adjacent conveyor section to connect the two sections together end-to-end. U-shaped brackets 28 are also used to connect the upper and lower plates 18, 20 together. The U-shaped brackets 28 also include side openings 50 for use in connecting to U-shaped brackets of an adjacent conveyor section to connect the two sections together end-to-end. As can be best seen from FIG. 1, once assembled, the sidewalls 22 and 24 are located internally of the U-shaped brackets 28, which can allow operator access to the openings to facilitate assembly and disassembly of adjacent conveyor sections.

Referring to FIG. 3, a dual-lane conveyor section 51 includes a pair of side-by-side lanes 52 and 54, each lane accommodating objects (e.g., caps) being moved along substantially parallel conveyor paths $P_1$ and $P_2$. Guide rails 56 (represented by dotted lines) are used to guide the objects along their respective conveyor paths $P_1$ and $P_2$ and keep the objects in their respective lanes. The dual-lane conveyor section 51 includes features similar to those described above including upper plate 58 with apertures 60, lower plate 62 and strips 64 with notches 65 that form sidewalls 66 and 68 of a plenum 70. The upper and lower plates 58 and 62 are wider than the plates 18 and 20 of FIGS. 1 and 2 to accommodate the two lanes 52 and 54. As above, the lower plate 62 includes a clean-out opening 70 with associated door 72.

Referring also to FIG. 4, the dual-lane conveyor section 51 includes an end plate 74. The end plate 74 can be used to cap an end of the plenum 70 to inhibit pressurized air from escaping thereby and maintain a pressurized condition within the plenum during operation. The end plate 74 may be connected to an adjacent conveyor section, such as a chute or other type of section.

Figure 5:
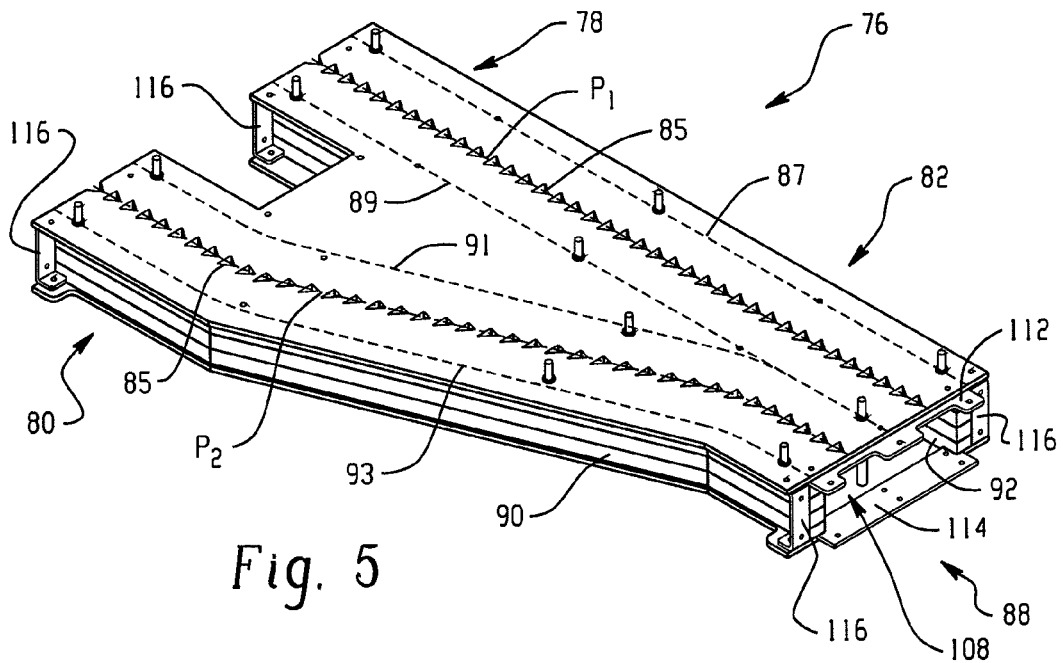
FIG. 5 is a perspective view of an embodiment of a conveyor section for a pneumatic conveyor system.

Referring now to FIG. 5, a connector conveyor section 76 is shown for merging two parallel, single-lane conveyor sections into a single, dual-lane conveyor section. The connector conveyor section 76 is Y-shaped and includes a first portion 78 that connects to a first adjacent conveyor section (not shown) and a second portion 80 that connects to a second adjacent conveyor section (not shown). The first and second portions 78 and 80 merge together into a third portion 82 where the first and second portions have their own conveyor paths $P_1$ and $P_2$ (and associated apertures 85) that merge onto the third portion.

In the depicted embodiment, conveyor path $P_1$ is relatively straight as it extends from the first portion 78 through the third portion 82. By contrast, conveyor path $P_2$ curves and merges into the third portion 82 thereby decreasing a cross-conveying direction distance between the conveyor paths $P_1$ and $P_2$ at the third portion. An end 88 of the third portion 82 connects to an adjacent, dual lane conveyor section in a fashion similar to that described above, for example with reference to FIGS. 1 and 2. Guide rails 87, 89, 91 and 93 (represented by dotted lines) are provided for guiding objects along their respective paths $P_1$ and $P_2$.

Figure 6:
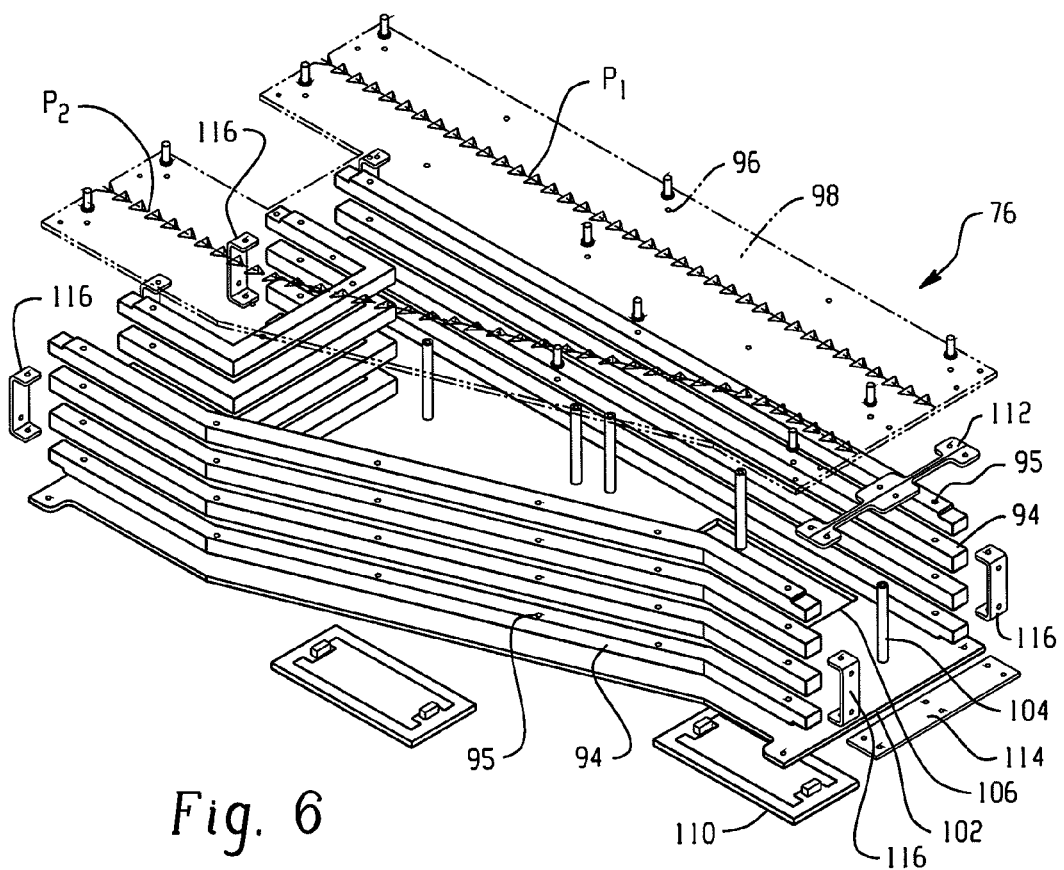
FIG. 6 is an exploded view of the conveyor section of FIG. 5.

An exploded view of the conveyor section 76 is shown by FIG. 6. As above, sidewalls 90 and 92 (see FIG. 5) are formed by respective stacks of strips 94 that are aligned vertically and stacked one on top of another. Each strip 94 is shaped to somewhat follow their nearest conveyor paths $P_1$ and $P_2$. The strips 94 include openings 95 that can be aligned with openings 95 of adjacent strips and with openings 96 formed in an upper plate 98 (shown in phantom) and openings (not shown) formed in a lower plate 102. Fasteners may be inserted through the aligned openings to fasten the assembly together. Spacers 104 may also be used. The lower plate 102 may include clean-out openings 106 for clearing debris from plenum 108 (see FIG. 5). The clean-out openings 106 may be closed by respective doors 110 having closed and open configurations. The conveyor section 76 includes splicer plates 112 and 114 and U-shaped brackets 116 for connecting to adjacent conveyor sections in a fashion similar to that described above with reference to FIGS. 1 and 2.

Referring to FIG. 7, another conveyor section embodiment 120 is a vertical turn section for conveying objects, such as caps for use in closing/sealing containers. The conveyor section 120 provides a bend in the conveyor path thereby changing the direction of travel of an object traveling therealong from a more vertical direction of travel to a more horizontal direction of travel. The conveyor section 120 includes an infeed end 124, an outfeed end 126 and a conveyor path P that extends from the infeed to the outfeed side. A plenum 128 is provided, which is formed between an upper plate 130, a lower plate 132 and sidewalls 134 and 136 extending between the upper and lower plates. As above, the plenum 128 provides a passageway for directing pressurized fluid such as air to louvers or apertures 138 formed through the upper plate 130. Guide rails 140 and 142 (represented by dotted lines) are provided for use in guiding the objects along the conveyor path P.

An exploded view of the conveyor section 120 is shown by FIG. 8 with the upper plate 130 shown in phantom. The sidewalls 134 and 136 are formed by respective strips 143. In the illustrated example, each sidewall 134 and 136 includes one strip 143, however, any suitable number of strips may be used, such as four stacked strips. Each strip 143 is also U-shaped, somewhat following the conveyor path P. The strips 143 include slots 145 that can be aligned with openings 147 formed in the upper plate 130 and openings 149 formed in the lower plate 132. Fasteners may be inserted through the aligned slots 145 and openings 147, 149 to fasten the assembly together.

The strips 143 of each sidewall 22 and 24 each include upper and lower notches 148 and 151, respectively, at their respective ends. The notches 148 face upwardly toward the upper plate 130 and the notches 151 face downwardly toward the lower plate 132. Once assembled, the notches 148 and 151 provide gaps between the strips 143 and the upper and lower plates 130 and 132. Splicer plates 150 and 152 are sized to be located in the gaps formed by the notches 146 and 148. The splicer plates 150 and 152 are also sized to fit within similar gaps of an adjacent conveyor section to connect the two sections together end-to-end. As above, U-shaped brackets 28 are also used to connect the upper and lower plates 130 and 132 together and also include side openings 50 for use in connecting to U-shaped brackets of an adjacent conveyor section.

The upper and lower plates described above may be made of any suitable material, such as metal (e.g., stainless steel) and formed by any suitable process, such as stamping, cutting, etc. In some embodiments, the upper surface of the upper plates may be finished (e.g., by brushing, polishing, etc.) to provide a smooth, low-friction surface along which the objects can travel.

Figure 9:
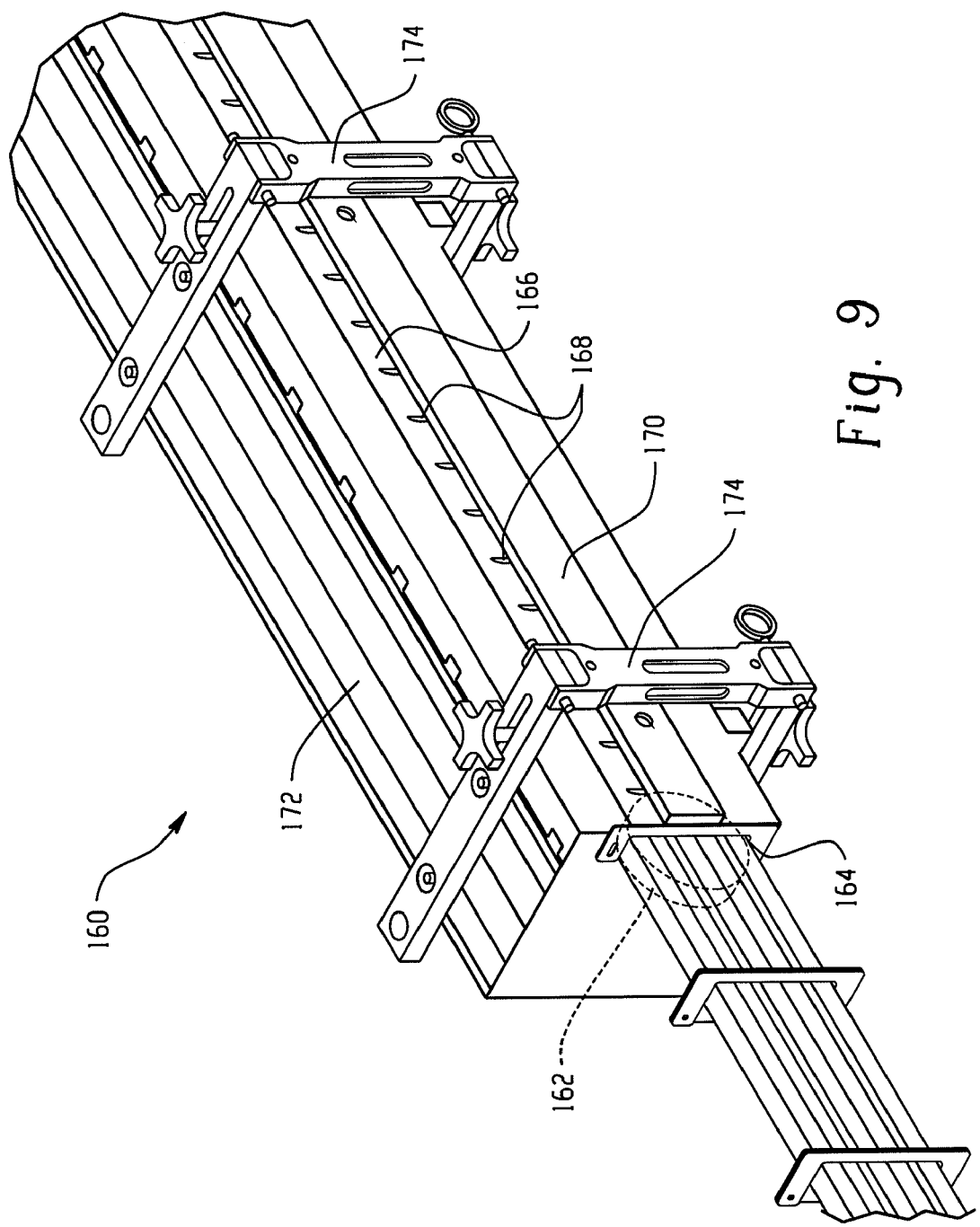
FIG. 9 is a perspective, partial view of another embodiment of a conveyor section for a pneumatic conveyor system.
Figure 10:
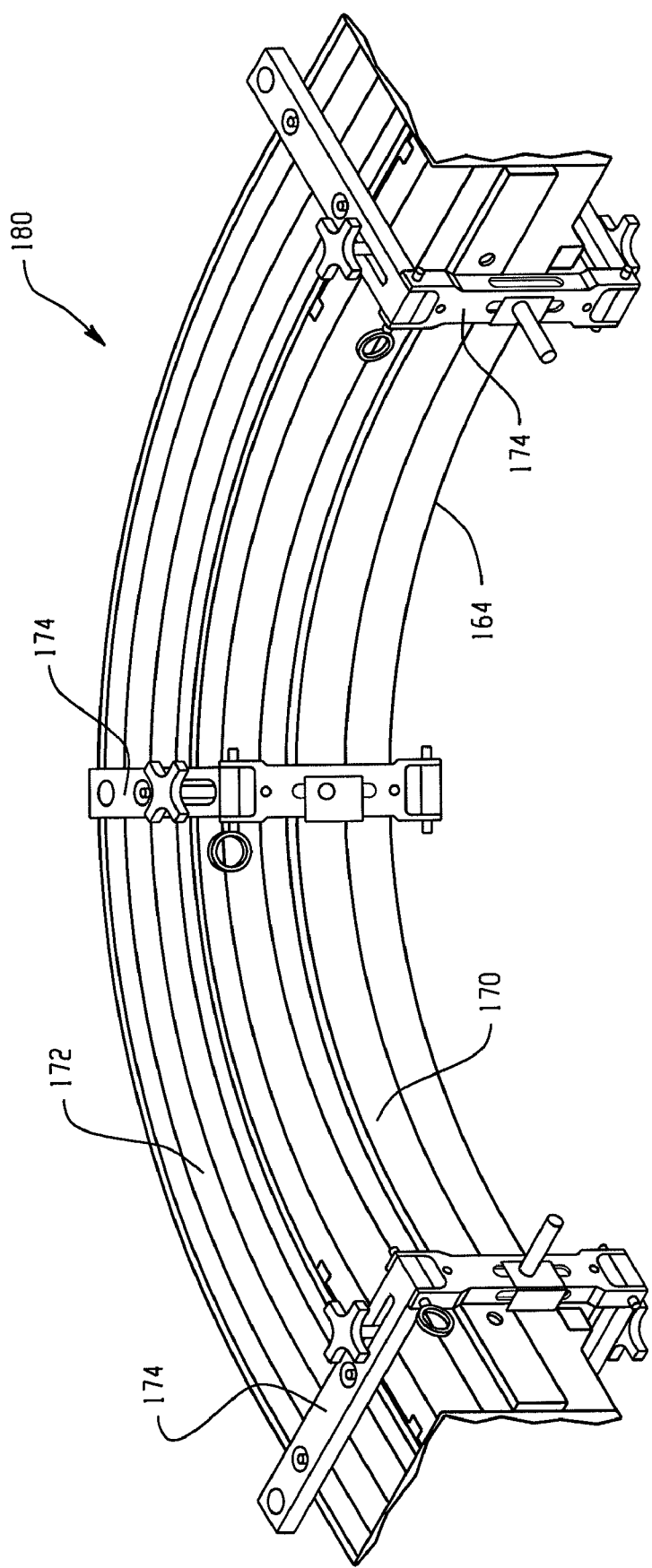
FIG. 10 is a perspective, partial view of an embodiment of a conveyor section for a pneumatic conveyor system.

While the above description focuses on various conveyor sections where the cap is conveyed along the top plate, other configurations are possible. For example, referring to FIG. 9, a side conveyor embodiment 160 is shown where caps 162 are conveyed on their sides as shown. A track 164 is formed adjacent side plate 166 that includes the openings 168 that are used to deliver the pressurized air that moves the caps 162 therealong. An outer guide wall 170 extends substantially parallel to the side plate 166 and is spaced-apart therefrom to provide a gap through which the caps 162 can pass. In this embodiment, upper wall and lower wall are formed by horizontally aligned stacks of plastic strips 172 in a fashion similar to that described above with the plenum located therebetween. The assembly is fastened together using brackets 174. A curved side conveyor section embodiment 180 is shown by FIG. 10. In another embodiment, a bottom conveyor embodiment (not shown) may be used. The bottom conveyor embodiment may be similar to the embodiment 160 of FIG. 9 rotated 90 degrees so the side plate 166 faces downward.

The above-described conveyor sections can be advantageously formed without any welding process using only mechanical fasteners, which can reduce the time and cost associated with assembling the conveyor system.

It is to be clearly understood that the above description is intended by way of illustration and example only and is not intended to be taken by way of limitation, and that changes and modifications are possible. Accordingly, other embodiments are within the scope of the following claims.

What is claimed is:

1. In a pneumatic conveyor comprising multiple, assembled conveyor sections, a conveyor section providing a curved conveyor path with a plenum through which pressurized air is delivered, the conveyor section comprising:
    a top plate including a series of apertures extending therethrough for delivering pressurized air from the plenum to an upper surface of the top plate, the apertures being arranged and configured to direct the pressurized air to move an article along the top plate in a conveying direction;
    a bottom plate beneath the top plate;
    a first stack of vertically aligned, individual strips clamped together between the top plate and the bottom plate to define a first sidewall of the plenum; and
    a second stack of vertically aligned, individual strips clamped together between the top plate and the bottom plate to define a second sidewall of the plenum.

2. The conveyor section of claim 1 in the form of a horizontal turn having the curved conveyor path, the individual strips of the first and second stacks being continuous in length along substantially the entire length of the turn.

3. The conveyor section of claim 1, wherein the individual strips of the first and second stacks are curved and comprise plastic.

4. The conveyor section of claim 3, wherein the top plate and the bottom plate comprise metal.

5. The conveyor section of claim 1, wherein the individual strips of the first and second stacks each are rectangular in cross-section with respective upper and lower surfaces seated against each other in a sealing manner.

6. The conveyor section of claim 1, wherein each first and second stacks include at least three vertically aligned, individual strips.

7. The conveyor section of claim 1 in the form of a dual lane conveyor section including multiple, curved conveyor paths, the conveyor paths separated by a guide rail.

8. The conveyor section of claim 1 including a first section with a first conveyor path and a second section with a second conveyor path, the first section spaced from the second section, wherein the first and second sections merge into a third section including both the first and second conveyor paths.

9. The conveyor section of claim 8, wherein only the second conveyor path is curved.

10. The conveyor section of claim 1, wherein the lower plate includes a clean-out opening extending therethrough and an associated door for opening and closing the clean-out opening.

11. The conveyor section of claim 1, wherein the conveyor section is weld-free.

12. A method of assembling a pneumatic conveyor comprising multiple, assembled conveyor sections, the method comprising:
    forming a conveyor section providing a curved conveyor path without any welding by
        stacking multiple plastic strips one on top of the other to form a first stack of plastic strips;
        stacking multiple plastic strips one on top of the other to form a second stack of plastic strips; and
        clamping the first and second stacks of plastic strips between an upper plate and a lower plate using only mechanical fasteners such that the first and second stacks form spaced-apart sidewalls of a plenum extending along the conveyor path for delivering pressurized air to apertures extending through the upper plate, the apertures arranged and configured for directing the pressurized air for moving an article along the top plate in a conveying direction; and
    connecting the conveyor section to an adjacent conveyor section.

13. The method of claim 12, wherein surfaces of strips seat against each other and against the upper and lower plates in a sealed manner.

14. The method of claim 12, wherein the plastic strips are formed pre-curved to match the desired curve of the conveyor path.

15. The method of claim 12, wherein the plastic strips have aligned openings through which fasteners are passed.

16. In a pneumatic conveyor comprising multiple, assembled conveyor sections, a conveyor section with a plenum through which pressurized air is delivered, the conveyor section comprising:
    a first side plate including a series of apertures extending therethrough for delivering pressurized air from the plenum to an outer surface of the side plate, the apertures being arranged and configured to direct the pressurized air to move an article along the side plate in a conveying direction;

a second side plate opposite the first side plate and spaced-apart therefrom;

a first stack of aligned, individual strips clamped together between the first and second side plates to define a top wall of the plenum; and a second stack of aligned, individual strips clamped together between the first and second side plates to define a bottom wall of the plenum.

17. The conveyor section of claim 16 further comprising a track that extends alongside the first side plate, the track supporting articles as they are moved along the side plate in the conveying direction.

* * * * *